United States Patent [19]

Frankland

[11] 4,244,841

[45] Jan. 13, 1981

[54] METHOD FOR RECYCLING RUBBER AND RECYCLED RUBBER PRODUCT

[75] Inventor: W. Howard Frankland, Tampa, Fla.

[73] Assignee: Frankland Enterprises, Inc., Tampa, Fla.

[21] Appl. No.: 133,565

[22] Filed: Mar. 24, 1980

[51] Int. Cl.$^3$ ............................................. B29G 5/02
[52] U.S. Cl. ................................. 260/2.3; 264/109; 264/122; 264/126
[58] Field of Search .................... 264/109, 122, 126; 260/2.3

[56] References Cited

U.S. PATENT DOCUMENTS

| | | | |
|---|---|---|---|
| 2,977,864 | 4/1961 | Pollar | 264/122 |
| 3,267,187 | 8/1966 | Slosberg et al. | 264/126 |
| 3,344,094 | 9/1967 | de Gaugue | 264/109 |
| 4,051,080 | 9/1977 | Boccoli | 260/2.3 |

Primary Examiner—Donald E. Czaja
Assistant Examiner—James R. Hall
Attorney, Agent, or Firm—Duckworth, Hobby, Allen & Pettis

[57] ABSTRACT

A unique method for recycling rubber scrap to yield a final product of at least about one inch in thickness characterized by the absence of the use of alkalis, acids or organic solvents in the steps of the process. Finely ground dry rubber scrap is intimately mixed with a cure mix comprising about nine parts, by weight, dry sulfur and not more than about one part, by weight, zinc stearate. The resulting dry cure mix and dry rubber scrap mixture is placed into a mold and cured in a steam autoclave for about 1.25–4 hours at a temperature of about 325° F., preferably, while maintaining a steam pressure within the autoclave of about 125 psi, preferably. Actual curing time is determined by the thickness of the final product. The final recycled rubber product is also claimed.

15 Claims, No Drawings

METHOD FOR RECYCLING RUBBER AND RECYCLED RUBBER PRODUCT

BACKGROUND OF THE INVENTION

1. Field of the Invention

The present invention relates to a method for recycling rubber scrap, primarily tire tread buffings, to obtain a final recycled rubber product of at least about one inch in thickness. The method is characterized by its use of only dry ingredients which are intimately mixed, formed in a mold and cured into a steam autoclave. The final recycled rubber product actually wears and weathers better than new rubber and may be formulated in various hardnesses from about 55 to about 90 as measured on the Shore A scale. Products formulated according to the method of this invention are suitable for a variety of uses such as, for example, paving or stepping stones, floor coverings, resilient bumpers for highway guard rails, railroad tie pads, etc.

2. Background of the Invention

Numerous methods and processes for reclaiming vulcanized rubber scraps are known in the prior art. Perhaps the earliest patent for a reclaiming process was British Pat. No. 11,147 to Parkes, issued in 1846. That patent teaches that scrap rubber may be heated under pressure with calcium hypochlorite until the mass could be kneaded. This mass was then washed with alkali and hot water. U.S. Pat. No. 22,217 to Hall discloses a heater process for reclaiming rubber wherein finely ground rubber is mixed with a small quantity of softener and with caustic soda followed by heating in horizontal autoclaves for several hours in steam at temperatures from 347° to 410° F. An acid reclamation process is disclosed in U.S. Pat. No. 249,970 to Mitchell wherein the rubber scrap is first treated with a 10-25% sulphuric acid. An alkali process is taught by U.S. Pat. No. 635,141 to Marks, et al., and for a long time this was the most important commercial process for reclaiming rubber. A similar method for reclaiming rubber is taught by U.S. Pat. No. 673,057 to Cutler. Both the Cutler process and the Marks alkali process require the use of reclaiming oils. Other methods utilized for reclaiming rubber have been described in the literature as the acid process, the superheated steam process, the high pressure steam process, and the catalytic processes, in addition to mechanical processes using internal mixers and special extruders.

However, the literature observes that the physical properties of reclaimed rubbers are distinctly inferior to those of ordinary rubber and, in practice, such reclaimed rubbers are only used as fillers or to facilitate certain manufacturing operations such as extrusion. J. LeBras, INTRODUCTION TO RUBBER at 88 (1965). D. Huke states that most reclaimed rubber is obtained from tires, and that this rubber is treated so that it can be re-milled and incorporated into a rubber mix. D. Huke, INTRODUCTION TO NATURAL AND SYNTHETIC RUBBERS at 76 (1961). In fact, virtually all the prior art literature concerning reclaimed rubber and methods for reclaiming concern themselves with obtaining a "de-vulcanized" product for use as a filler/additive/extender in subsequent manufacturing operations. Also, as shown above and as is evident from a review of the pertinent prior art literature, today's processes for reclaiming rubber involve treating the rubber scrap with alkali, acid, solvents, superheated steam, mechanical agitation and shearing, or combinations of the above. For example, one of the more modern processes for reclaiming cured rubber scraps is disclosed in U.S. Pat. No. 4,051,080 to Boccoli. It is therefore apparent that there is a great need in the art for a method of not merely "reclaiming" rubber as taught in the prior art but of "recycling" rubber wherein operating conditions of the method are simplified and do not require treatment with alkalis, acids or oils. It would furthermore be desirable if the method could be accomplished so as to derive a final recycled rubber product suitable for commercial use, per se, without need of any further manufacturing process. It is therefore desirable that any such method would be sufficiently variable so as to provide final products of varying sizes, shapes, and degrees of hardness, such as highway guard rail extension blocks which hold the guard rails about eight inches from their vertical support posts. It was primarily as a result of efforts to produce such a product that the subject matter of this patent was developed.

SUMMARY OF THE INVENTION

The present invention relates to a method for recycling rubber scrap whereby a final product of at least about one inch in thickness is obtained. While a variety of rubber scrap sources may be utilized as the main ingredient for the method, the invention preferably contemplates the use of tire tread buffings. However, the invention is not necessarily to be limited thereto. It is further to be understood that foreign material such as textile fibers or metal which may be present in the tire tread buffings is first removed according to state-of-the-art procedures. The tire tread buffings are then ground to a substantially uniform size of a dry, sand-like consistency.

The active ingredient of the reclamation method may be referred to as a cure mix, and predetermined amounts of cure mix are admixed into the dry ground rubber for further processing. The cure mix comprises an intimate mixture of about nine parts, by weight, dry sulfur and not more than about one part, by weight, zinc stearate. The sulfur is substantially pure, will pass through a 300 mesh screen, and is generically referred to as rubber makers' sulfur. The primary function of the zinc stearate is to maintain the sulfur in a free-flowing condition. It is to be understood that the method of the present invention could be accomplished without the use of any zinc stearate.

Depending upon the desired Shore A hardness of the final product, from about 3 to about 8 parts, by weight, of the cure mix are then admixed with about 100 parts, by weight, ground scrap rubber.

The resulting cure mix and dry ground rubber mixture is then placed into a mold. As will be set forth in great detail hereinafter, the mold is preferably overfilled by about 2½ times the desired thickness of the final product. The overfilled mold is compressed to the final desired thickness of at least about one inch, closed and placed into a steam autoclave for curing. Again, depending upon the thickness of the final product, the curing step is allowed to proceed for about 1.25–4 hours at a temperature of from about 310° F. to less than 350° F. while maintaining a steam pressure within the autoclave of about 77–130 psi. Temperatures above 350° F. are undesirable for the reason that at this temperature the rubber molecules begin to break down and a relatively tacky final product will be obtained.

The molds are then removed from the autoclave, cooled and the final product is removed therefrom. Cooling may be accomplished by passing a fluid stream such as, for example, water or air, across the molds. It is to be understood that a specific step calling for cooling of the molds is not required for the method of this invention. Cooling is accomplished primarily for purposes of ease in handling the final product. It should also be noted that if the final product is allowed to cool down within the mold under ambient conditions, the resulting product will exhibit a Shore A hardness about five points higher than similar formulations cooled by the fluid stream.

While detailed examples for various methods of practicing this invention will be presented below, it can now be seen that the method of the present invention provides an extremely efficient, relatively inexpensive method for recycling rubber scrap and processing that scrap into a final product of virtually any shape or configuration and of a thickness of from 1 to about 8 inches. Prior to the method of this invention reclaimed rubber products could not be formed in thicknesses greater than about 1". If a thicker final product was desired, it was necessary to laminate the reclaimed rubber sheets together.

The final rubber product obtained through the method of this invention is extremely durable and actually lasts as well or better than "new" rubber. Because of the unique molding recycling process a virtually infinite variety of shapes and surface configurations may be obtained. Furthermore, dry ground colored rubber may be added to the mold just before it is compressed and closed, and this will result in a final product having a colored surface. In similar fashion, pellets of dry natural rubber may be placed in the mold before it is compressed and closed which will result in an unique appearance of one surface of the final product. Accordingly, the final recycled rubber product of this invention is suitable for use in forming, for example, roofing tiles, paving "stones," floor covering, highway guard rail extensions, railroad tie pads, etc. Finally, since there may clearly be some waste from the recycling method of this invention, it should be noted that the recycled rubber formed by this method may be "recycled" over and over again. That is to say, the recycled rubber product of this invention may be ground and "recycled" by repeating the method of this invention. However, it should be noted that in this situation the once-recycled ground rubber should not constitute any more than about 20–25% of the total dry ground rubber content.

Attention is again invited to the fact that both the method and product of this invention utilize a totally dry mix. The hardness (Shore A measurement) of the final recycled product is determined by the amount of sulfur utilized as well as the curing parameters. The size and shape of the recycled product is determined by the mold. It should especially be noted that the final reclaimed product is suitable for use as soon as it has cooled sufficiently to be handled.

The invention accordingly comprises the several steps and the relation of one or more of such steps with respect to each of the others, and the composition possessing the features, properties, and the relation of constituents which are exemplified in the following detailed disclosure, and the scope of the invention will be indicated in the claims.

DETAILED DESCRIPTION

The present invention relates to a method for recycling rubber scrap so as to provide a final recycled rubber product of predetermined shape and at least about one inch in thickness. The following examples, then, are set forth in order to describe fully the method and the resulting product of the present invention.

EXAMPLE I

A cure mix was prepared by intimately mixing together about nine parts, by weight, rubber maker's sulfur sized to pass through a 300 mesh screen and about one part, by weight, cosmetic grade zinc stearate. Three parts, by weight, of this cure mix was then admixed with about one hundred parts, by weight, ground tire tread buffings. It is to be noted that any foreign matter such as, for example, textile fibers or metal, had already been removed from the tire tread buffings. The resulting cure mix and ground rubber dry mixture was next placed into molds about five inches deep. The molds were closed and compressed at about 400 psi to a final thickness of about two inches. These molds were then placed into a steam autoclave and maintained at a temperature of about 344° F. and a steam pressure of about 125 psi for approximately 1½ hours. After curing for this time, the molds were removed from the autoclave and cooled by spraying water thereon for approximately thirty minutes. The final recycled rubber product was removed from the molds and tests of various samples exhibits a Shore A hardness of from 55-65.

The final product defined blocks approximately 4⅞" wide by 9⅞" long by 2" thick. They were of a uniform black color and exhibited a relatively smooth surface. Unlike natural rubbers and products formed therefrom, the blocks formed according to the method of this invention do not possess any nerve and do not exhibit any "memory" characteristics upon being subjected to stress or heat.

EXAMPLE II

The method of Example I was substantially repeated; however, about six parts, by weight, cure mix were mixed with about one hundred parts, by weight, ground rubber. All other operating conditions were substantially as set forth in Example I. When the final product was removed from the mold and tested for hardness it exhibited Shore A hardness of from about 75–80. This increase in hardness is attributed to the increased percentage of sulfur in the final product.

EXAMPLE III

The method of Example I was substantially repeated; however, about eight parts, by weight, cure mix were mixed with about one hundred parts, by weight, ground rubber. All other operating conditions were substantially as set forth in Example I. When the final product was removed from the mold and tested for hardness it exhibited Shore A hardness of about 90. This increase in hardness is attributed to the increased percentage of sulfur in the final product.

EXAMPLE IV

A cure mix was prepared by intimately mixing together about nine parts, by weight, rubber maker's sulfur sized to pass through a 300 mesh screen and about one part, by weight, cosmetic grade zinc stearate. Three parts, by weight, of this cure mix was then admixed with about one hundred parts, by weight, ground tire tread buffings. It is to be noted that any foreign matter such as, for example, textile fibers or metal, had already been removed from the tire tread buffings. The resulting cure mix and ground rubber dry mixture was next placed into molds about ten inches deep. The molds were closed and compressed to a final thickness of about four inches. These molds were then placed into a steam autoclave and maintained at a temperature of about 340° F. and a steam pressure of about 125 psi for approximately 2.25 hours. After curing for this time, the molds were removed from the autoclave and cooled by spraying water thereon for approximately thirty minutes. The final recycled rubber product was removed from the molds and tests of various samples exhibited a Shore A hardness of from 55–65.

The final product defined blocks approximately $4\frac{7}{8}''$ wide by $9\frac{7}{8}''$ long by 4" thick. They were of a uniform black color and exhibited a relatively smooth surface. Unlike natural rubbers and products formed therefrom, the blocks formed according to the method of this invention do not possess any nerve and do not exhibit any "memory" characteristics upon being subjected to stress or heat.

EXAMPLE V

The method of Example I was repeated, but cooling was accomplished by a stream of air blown across the molds after they had been removed from the autoclave. No significant differences in the appearance or structural characteristics of the final product were noted.

EXAMPLE VI

A cure mix was prepared comprising only rubber maker's sulfur sized to pass through a 300 mesh screen without the addition of any zinc stearate thereto. Three parts, by weight, of the sulfur were added to one hundred parts, by weight, of ground rubber and this mixture was processed for reclamation in accord with the steps of Example I. While the final recycled rubber product resulting from this example was substantially identical to that obtained in Example I, it was noted that there was a tendency for the sulfur to cohese and create lumps. This did necessitate more careful admixing of the pure dry sulfur cure mix and dry ground rubber prior to filling the molds.

EXAMPLE VII

A cure mix was prepared by intimately mixing together about nine parts, by weight, rubber maker's sulfur sized to pass through a 300 mesh screen and about one part, by weight, cosmetic grade zinc stearate. Three parts, by weight, of this cure mix was then admixed with about one hundred parts, by weight, ground tire tread buffings. It is to be noted that any foreign matter such as, for example, textile fibers or metal, had already been removed from the tire tread buffings. The resulting cure mix and ground rubber dry mixture was next placed into molds about five inches deep. The molds were closed and compressed to a final thickness of about two inches. These molds were then placed into a steam autoclave and maintained at a temperature of about 325° F. and a steam pressure of about 95 psi for approximately 1.25 hours. After curing for this time, the molds were removed from the autoclave and cooled by spraying water thereon for approximately thirty minutes. The final recycled rubber product was removed from the molds and tests of various samples exhibited a Shore A hardness of about 60.

The final product defined blocks approximately $4\frac{7}{8}''$ wide by $9\frac{7}{8}''$ long by 2" thick. They were of a uniform black color and exhibited a relatively smooth surface. Unlike natural rubbers and products formed therefrom, the blocks formed according to the method of this invention do not possess any nerve and do not exhibit any "memory" characteristics upon being subjected to stress or heat.

EXAMPLE VIII

A cure mix was prepared as in Example I. Also as in Example I about three parts, by weight, of the cure mix were admixed with about one hundred parts, by weight, ground rubber. However, the ground rubber of this example consisted essentially of about 75% tire tread buffings and about 25% ground recycled rubber prepared in accord with the method of this invention. This dry mixture was then further processed in accord with the steps set forth in Example I. The final product obtained according to the method of this example was substantially identical to that of Example I in hardness, but its appearance was somewhat less homogeneous when cross-sectioned.

EXAMPLE IX

Final recycled rubber products similar to those prepared in accord with Example II were tested for use as resilient members placed between the vertical support and the horizontal rail of a highway guard rail construction. The product of this invention exhibited excellent physical characteristics and proved to be quite unaffected by varying weather conditions.

While the above examples have been presented with specific relation to specified method parameters and use of the final product as a highway guard rail resilient member, it is to be understood that the method and product of the claimed invention is not to be limited thereby. The claimed method may be utilized to prepare recycled rubber products of varying size, shape, hardness and end use as indicated hereinabove.

It will thus be seen that the objects set forth above, among those made apparent from the preceding description, are attained, and since certain changes may be made in carrying out the above method and in the product set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,
What is claimed is:

1. A method for recycling rubber scrap to yield a final product of at least about one inch in thickness, said method comprising the steps of:
   a. preparing a cure mix by intimately mixing together about nine parts, by weight, sulfur and not more than about one part, by weight, zinc stearate;
   b. admixing about 3–8 parts, by weight, of said cure mix with about 100 parts, by weight, dry ground rubber;
   c. placing the resulting cure mix and ground rubber mixture into a mold;

d. closing said mold and compressing said mixture to a thickness of at least about one inch;
e. placing said closed mold into a steam autoclave;
f. curing said mixture within said mold in said steam autoclave for about 1.25-4 hours at a temperature of about 310° F. to less than about 350° F. while maintaining a steam pressure within said autoclave of about 77-130 psi;
g. removing said mold from said autoclave; and
h. removing the final recycled rubber product from said mold.

2. A method as in claim 1 wherein said sulfur is sized to pass through a 300 mesh screen.

3. A method as in claim 1 comprising admixing about 3 parts, by weight, of said cure mix to said ground rubber whereby said final product will exhibit a hardness of about 55-65 Shore A.

4. A method as in claim 1 comprising admixing about 6 parts by weight, of said cure mix to said ground rubber whereby said final product will exhibit a hardness of about 75-80 Shore A.

5. A method as in claim 1 comprising admixing about 8 parts, by weight, of said cure mix to said ground rubber whereby said final product will exhibit a hardness of about 90 Shore A.

6. A method as in claim 1 wherein said ground rubber comprises tire tread stock buffings.

7. A method as in claim 1 wherein said ground rubber comprises tire tread stock buffings and no more than about 25%, by weight, of said final reclaimed rubber product.

8. A method as in claim 1 wherein said mixture is compressed into said mold at about 400 psi to the predetermined thickness of said final product prior to placing said closed mold into said steam autoclave.

9. A method as in claim 1 wherein said curing is conducted at a temperature of about 344° F. while maintaining said pressure within said autoclave at about 125 psi.

10. A method as in claim 1 further comprising the step of cooling said mold prior to removing said final recycled rubber product.

11. A method as in claim 10 wherein said cooling comprises passing a fluid across said mold.

12. A method as in claim 10 wherein said cooling comprises spraying water onto said mold.

13. A method as in claim 10 wherein said cooling comprises spraying a gas onto said mold.

14. A method as in claim 13 wherein said cooling gas comprises air.

15. A recycled rubber product of at least about one inch in thickness formed by curing a mixture consisting essentially of 100 parts, by weight, dry tire tread stock buffings and 3-8 parts, by weight, dry cure mix wherein said cure mix comprises about nine parts, by weight, sulfur and not more than about one part, by weight, zinc stearate, in a steam autoclave for about 1.25-4 hours at a temperature of about 344° while maintaining a steam pressure within said autoclave of about 125 psi.

* * * * *